US012700516B2

(12) United States Patent
Ocampo Giraldo et al.

(10) Patent No.: US 12,700,516 B2
(45) Date of Patent: Aug. 4, 2026

(54) RADIATION MONITORING SYSTEMS, RADIOACTIVE MATERIAL STORAGE SYSTEMS AND ASSOCIATED COMPONENTS AND METHODS

(71) Applicant: Battelle Energy Alliance, LLC, Idaho Falls, ID (US)

(72) Inventors: Luis A. Ocampo Giraldo, Idaho Falls, ID (US); David L. Chichester, Idaho Falls, ID (US); James T. Johnson, Rigby, ID (US); Jay D. Hix, Idaho Falls, ID (US); Scott J. Thompson, Ammon, ID (US); Scott M. Watson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 244 days.

(21) Appl. No.: 18/501,888

(22) Filed: Nov. 3, 2023

(65) Prior Publication Data

US 2024/0153659 A1     May 9, 2024

Related U.S. Application Data

(60) Provisional application No. 63/382,139, filed on Nov. 3, 2022.

(51) Int. Cl.
| | |
|---|---|
| *G02B 6/42* | (2006.01) |
| *G01T 1/20* | (2006.01) |
| *G21F 5/00* | (2006.01) |
| *G21F 5/002* | (2006.01) |
| *G21F 5/12* | (2006.01) |

(52) U.S. Cl.
CPC ............ *G21F 5/125* (2019.01); *G01T 1/2002* (2013.01); *G01T 1/201* (2013.01); *G02B 6/4296* (2013.01); *G21F 5/002* (2013.01); *G02B 2006/4297* (2013.01)

(58) Field of Classification Search
CPC ....... G21F 5/125; G21F 5/002; G01T 1/2002; G01T 1/201; G02B 6/4296; G02B 2006/4297
See application file for complete search history.

(56) References Cited

U.S. PATENT DOCUMENTS

| | | | |
|---|---|---|---|
| 4,598,202 | A | 7/1986 | Koechner |
| 4,788,436 | A | 11/1988 | Koechner |
| | | (Continued) | |

FOREIGN PATENT DOCUMENTS

| | | | | |
|---|---|---|---|---|
| CN | 204009084 U | 12/2014 | | |
| CN | 109188501 A | * 1/2019 | ............. | G01T 1/201 |
| | | (Continued) | | |

OTHER PUBLICATIONS

CN 109188501 A (Year: 2018).*

(Continued)

*Primary Examiner* — Nicole M Ippolito
(74) *Attorney, Agent, or Firm* — TraskBritt

(57) ABSTRACT

A radiation monitoring system includes an optical fiber. The system further includes a scintillating fiber operatively coupled to a first end of the optical fiber at a first end of the scintillating fiber. The system also includes a damage detection device configured to detect damage to at least one of the optical fiber and the scintillating fiber.

20 Claims, 6 Drawing Sheets

(56) References Cited

U.S. PATENT DOCUMENTS

| | | | |
|---|---|---|---|
| 4,931,646 A | 6/1990 | Koechner et al. | |
| H801 H | 7/1990 | Koechner et al. | |
| 5,640,017 A | 6/1997 | Thevenin | |
| 6,703,622 B2 | 3/2004 | Joubert | |
| 8,110,807 B2 | 2/2012 | Gullickson | |
| 2010/0046690 A1 | 2/2010 | Proctor et al. | |
| 2012/0138806 A1 * | 6/2012 | Holmes et al. | |
| 2023/0418154 A1 * | 12/2023 | Leccese ................. B29C 33/40 | |

FOREIGN PATENT DOCUMENTS

| | | | | |
|---|---|---|---|---|
| CN | 111338178 A | * | 6/2020 | ....... B29D 11/00663 |
| CN | 117890956 A | * | 4/2024 | .............. G01T 3/06 |
| CN | 117950106 A | * | 4/2024 | .............. G02B 1/00 |
| WO | 2005/103759 A1 | | 11/2005 | |

OTHER PUBLICATIONS

CN 11133817 A (Year: 2020).*
CN 117890956 A (Year: 2024).*
CN 117950106 A (Year: 2024).*

* cited by examiner

RADIATION MONITORING SYSTEMS, RADIOACTIVE MATERIAL STORAGE SYSTEMS AND ASSOCIATED COMPONENTS AND METHODS

CROSS-REFERENCE TO RELATED APPLICATION

This application claims the benefit under 35 U.S.C. § 119(e) of U.S. Provisional Patent Application Ser. No. 63/382,139, filed Nov. 3, 2022, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-051D14517 awarded by the United States Department of Energy. The government has certain rights in the invention.

TECHNICAL FIELD

Radiation monitoring systems and radioactive material storage systems are disclosed. More specifically, radioactive material storage systems and associated radiation monitoring systems and components and methods are disclosed.

BACKGROUND

Storage facilities for radioactive materials, such as radioactive waste, residual radioactive materials, etc., may include underground storage areas. The radioactive materials are stored in sealed containers in the underground storage areas. The sealed containers are configured to substantially prevent radiation from the radioactive materials leaking into the surrounding environment. The storage facilities may also include radiation detectors or sensors configured to detect radiation in the surrounding environment to determine if radiation is leaking from the sealed containers into the surrounding environment. The radiation detectors or sensors may facilitate resolving leaks before sufficient radiation enters the surrounding environment to cause any irreparable damage.

BRIEF SUMMARY

Embodiments of the disclosure include a radiation monitoring system. The system includes an optical fiber. The system further includes a scintillating fiber operatively coupled to a first end of the optical fiber at a first end of the scintillating fiber. The system also includes a damage detection device configured to detect damage to at least one of the optical fiber and the scintillating fiber.

Other embodiments of the disclosure include a radioactive material storage system. The system includes a storage tunnel. The system further includes a storage area proximal to the storage tunnel. The system also includes a canister configured to contain radioactive material disposed in the storage area. The system further includes a radiation sensor at least partially disposed in the storage area. The radiation sensor includes a first segment comprising a scintillating fiber, the first segment positioned along a side surface of the canister. The radiation sensor further includes a second segment comprising an optical fiber coupled between the scintillating fiber and a monitoring module. The monitoring module is positioned in an accessible region a distance from the storage tunnel.

Another embodiment of the disclosure includes a method of monitoring a radiation detector. The method includes transmitting a light signal into a first end of an optical fiber. The method further includes receiving the light signal in a first end of a scintillating optical fiber positioned at a second end of the optical fiber opposite the first end of the optical fiber. The method also includes reflecting the light signal from a reflective element positioned on a second end of the scintillating optical fiber opposite the first end of the scintillating optical fiber. The method further includes receiving the light signal at the first end of the optical fiber. The method also includes determining if the radiation detector is damaged if the light signal is not received at the first end of the optical fiber.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
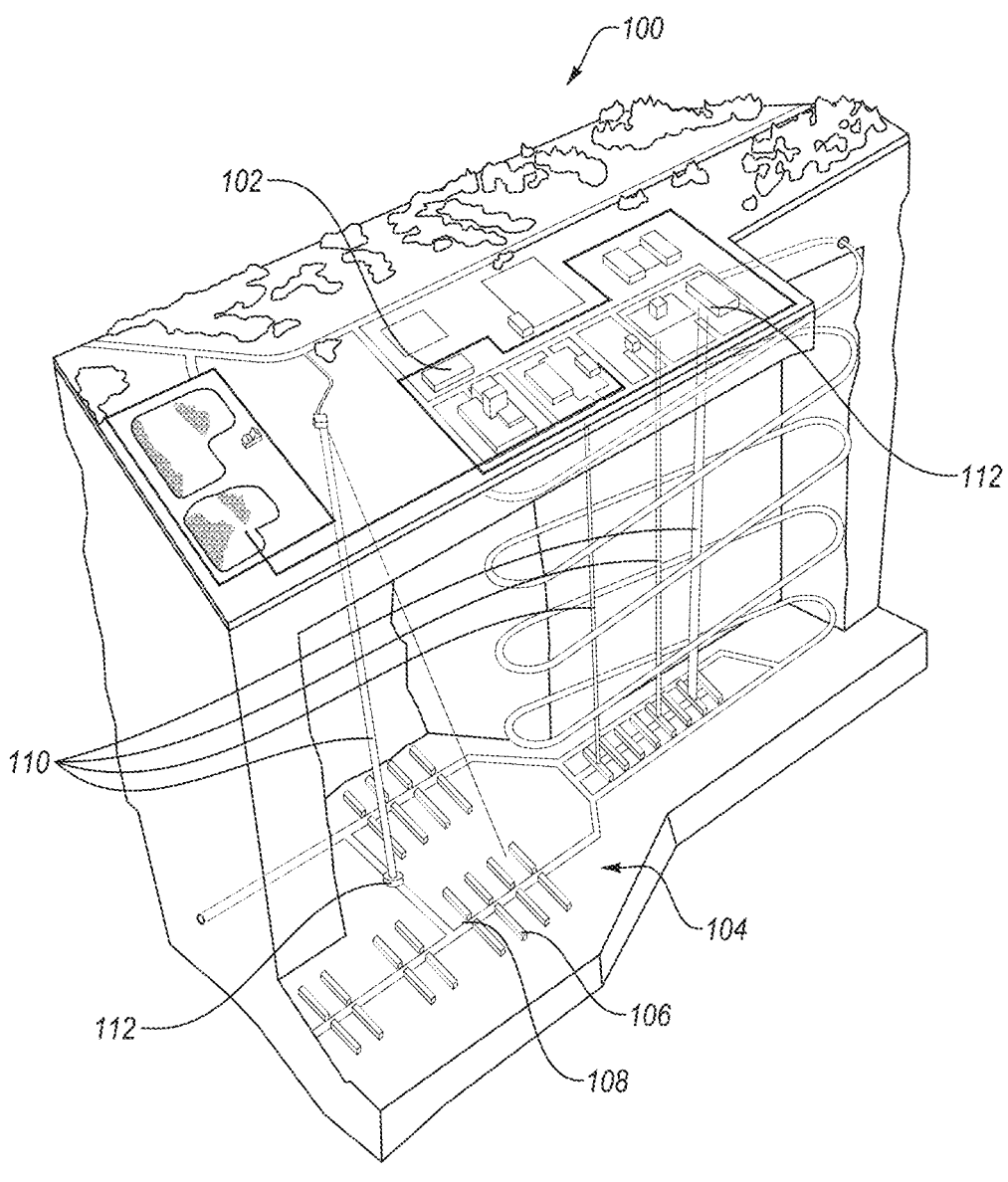
FIG. 1 illustrates a partial cutaway view of a storage facility in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "configured" and "configuration" refer to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the drawings, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

Stored radioactive material may be continuously monitored through different sensors and detectors. The sensors and detectors may facilitate detecting radiation leaking from the storage containers and may facilitate correcting or fixing leaks before sufficient radiation enters the surrounding environment to cause any significant damage. The storage areas for the radioactive material may include geological repositories, nuclear material storage facilities, spent fuel dry storage areas, inaccessible areas within nuclear facilities including reactors and reprocessing facilities, radiation-generating research facilities, medical radioisotope production facilities, medical irradiation therapy facilities, and other similar areas. While the embodiments illustrated and described in this disclosure are related to underground storage facilities, the disclosure is not so limited. Similar components and systems may be used in above ground storage facilities, radiation-generating research facilities, medical radioisotope production facilities, medical irradiation therapy facilities, etc. Monitoring radiation in difficult-to-access or inaccessible storage areas presents some challenges. These storage areas are difficult to reach and may also be subject to tampering with the monitoring equipment.

Monitoring equipment may be positioned in accessible areas, such as above ground areas, such that the sensors and detectors may be easily monitored from accessible areas. The monitoring equipment may facilitate continuous and/or real-time monitoring of the associated sensors and detectors. The monitoring equipment may also be configured to send notifications and alerts, such as alarms based on input from the sensors and detectors. Equipment that is serviceable (e.g., equipment that may need regular or periodic maintenance) may also be positioned in accessible areas to facilitate the maintenance of the equipment. The detectors and sensors may be suitable for flexible installation. For example, the sensors and detectors may be configured to be installed in a variety of different locations, different positions, and different styles. The sensors and detectors may be long sensors configured to extend large distances (e.g., on a kilometer scale) from the associated monitoring equipment, such that the sensors and detectors may be located in inaccessible areas or difficult to access areas, while the monitoring equipment remains in accessible areas. The sensors and detectors may also be configured to be used long term. For example, the sensors and detectors may be selected to be sensors and detectors that can be connected to different types of monitoring equipment, such that as systems are upgraded, the monitoring equipment may be changed without changing the sensors and detectors.

FIG. 1 illustrates an embodiment of a storage facility 100 (e.g., a geological repository or nuclear material storage facility). The storage facility 100 includes a surface facility 102, which may include operational equipment, monitors, offices, controllers, computers, etc., used to support the storage facility 100. The surface facility 102 may be positioned above an underground storage 104. The underground storage 104 may be configured to store radioactive materials, such as spent nuclear fuel, nuclear waste, nuclear material, laboratory waste, etc. However, the storage facility may include other types of storage areas, such as storage areas located above ground.

The underground storage 104 includes storage tunnels 106 and access tunnels 108. The storage tunnels 106 may be configured to contain (e.g., seal) radioactive materials behind multiple different barriers. The barriers may be configured to substantially prevent radiation leakage to the surrounding environment and to substantially prevent radiation leakage to the access tunnels 108. The access tunnels 108 may be configured to provide access for personnel and equipment, such as for maintenance, moving additional radioactive materials for storage, creating additional tunnels (e.g., storage tunnels 106 or access tunnels 108), etc.

The storage facility 100 may include one or more sensor connections 110 extending between the surface facility 102 and the underground storage 104. The sensor connections 110 may be wires, network cables, optical fibers, etc. For example, the underground storage 104 may include sensors, such as vibration sensors, radiation sensors, or tamper sensors. The sensors are connected to monitoring modules 112 configured to monitor the sensors. In some embodiments, the monitoring modules 112 are located in the surface facility 102, such that the sensor connections 110 provide a direct connection from the monitoring modules 112 in the surface facility 102 to the sensors in the underground storage 104. In other embodiments, the monitoring modules 112 are located in the access tunnels 108 or other accessible regions in the underground storage 104. In embodiments where the monitoring modules 112 are located in the underground storage 104, the sensor connections 110 may then be networking connections between the monitoring modules 112 and the surface facility 102.

Figure 2:
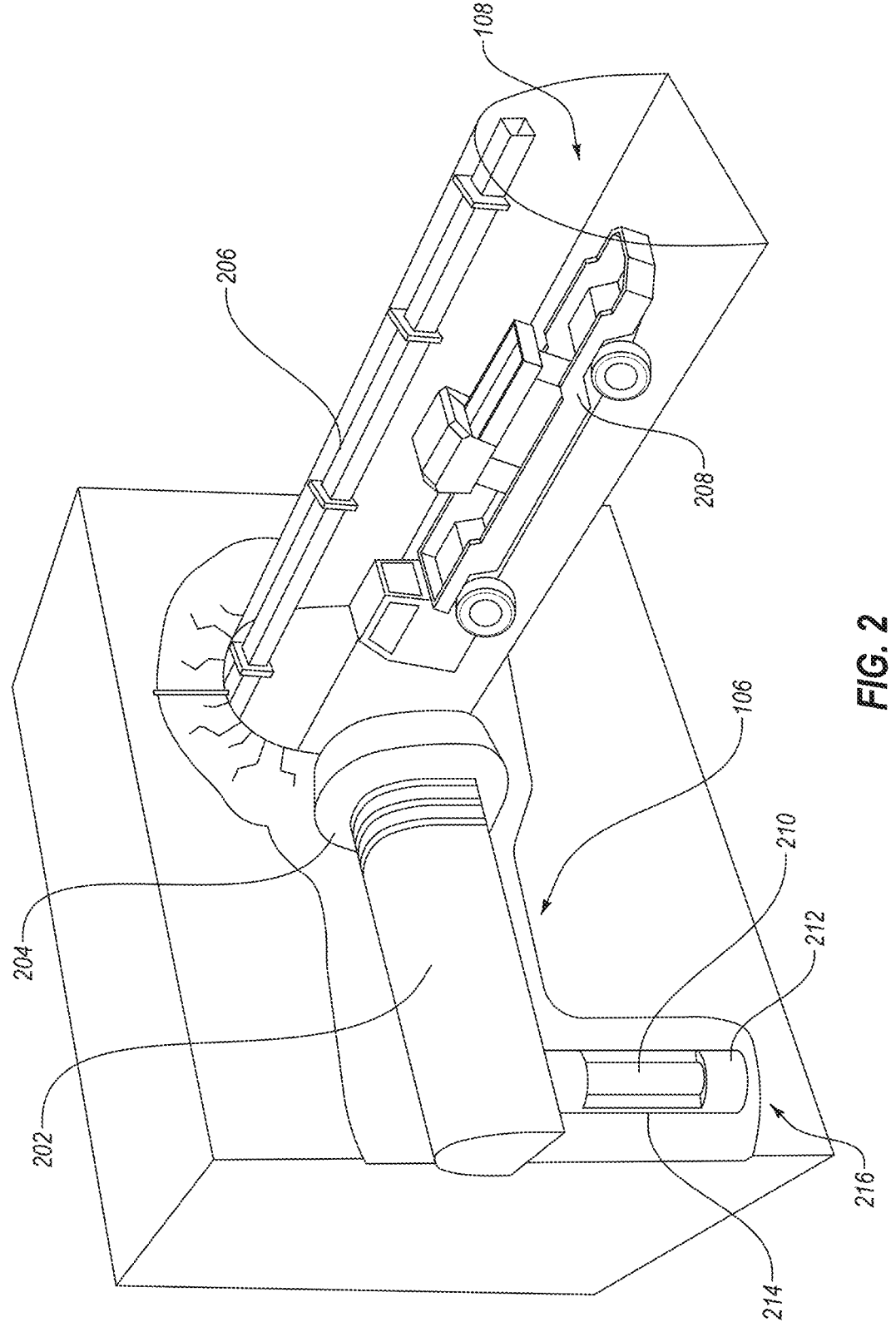
FIG. 2 illustrates an enlarged view of an underground portion of the storage facility of FIG. 1 in accordance with embodiments of the disclosure.

FIG. 2 illustrates an enlarged view of a junction between a storage tunnel 106 and an access tunnel 108 in the underground storage 104. As discussed above, the access tunnel 108 is an open tunnel configured to provide access for personnel and moving equipment 208. As illustrated in FIG. 2, the access tunnel 108 may provide access to stationary equipment 206, such as power busses, control modules, wiring, etc. The access tunnel 108 may also provide access for the moving equipment 208, such as maintenance vehicles, tunneling vehicles, transportation vehicles, etc.

The storage tunnel 106 is configured to store radioactive material. As illustrated in FIG. 2, the storage tunnel 106 includes one or more storage areas 216 proximal to the storage tunnel 106. Each storage area 216 is configured to receive a container 214. The container 214 may be configured to include multiple barrier layers between the environment around the storage area 216 and radioactive material stored within the container 214. For example, the container 214 may include one or more buffer materials 212 surrounding a canister 210. The canister 210 may be configured to store the radioactive materials therein. For example, the canister 210 may be formed from a shielding material (e.g., a material configured to shield radiation), such as copper, stainless steel, steel, titanium, tungsten carbide, graphite. The canister 210 may include an insert configured to house the radioactive material, such as a cast iron insert, a steel insert, a graphite insert, a beryllium insert, etc. The insert may include multiple cavities configured to receive the radioactive material. The insert may be formed from reflective materials configured to substantially prevent the passage of radiation, such as copper, steel, titanium, tungsten carbide, water, graphite or materials configured to absorb radiation, such as cast iron, boron carbide ($B_4C$), cadmium, hafnium, gadolinium, cobalt, samarium, titanium, dysprosium, erbium, europium, molybdenum, ytterbium, etc. When sealed the canister 210 may be configured to substantially prevent the transmission of radiation (e.g., gamma radiation) from the radioactive material within the canister 210 to the environment around the canister 210.

The canister 210 may be surrounded by the container 214 including one or more buffer materials 212. The buffer materials 212 may include materials configured to act as a radiation shield, such as bentonite, concrete, copper, lead, stainless steel, etc. The buffer materials 212 may be positioned on axial ends of the canister 210 and circumferentially around the canister 210, such that the canister 210 is substantially surrounded by the buffer materials 212. The container 214 is positioned in the storage area 216 proximal to the storage tunnel 106. In the embodiment illustrated in FIG. 2, the storage area 216 is connected to and extends from the storage tunnel 106. In some embodiments, multiple storage areas 216 may extend from a single storage tunnel 106.

The storage tunnel 106 may be filled with a backfill 202 after the container 214 is placed in the storage area 216. The backfill 202 may also be configured to form a radiation shield, similar to the buffer materials 212. In some embodiments, the backfill 202 is configured to be removed, such as to service the container 214 in the event a leak is detected. For example, the backfill 202 may be stacked blocks of shielding material. In other embodiments, the backfill 202 is configured to form a solid wall separating the storage tunnel 106 from the access tunnels 108. For example, the backfill 202 may be formed from crushed stone or concrete filling the storage tunnel 106.

After the storage tunnel 106 is filled with the backfill 202 a plug 204 is positioned at a mouth of the storage tunnel 106 near the junction between the storage tunnel 106 and the access tunnel 108. The plug 204 may also be formed from radiation shielding materials, such as concrete, bentonite, copper, lead, stainless steel, etc. The combination of the canister 210, the container 214, the backfill 202, and the plug 204 is configured to substantially block radiation from the stored radioactive materials, such that the radiation levels in the access tunnel 108 and other surrounding environments remain well below levels that are considered safe for people and equipment.

Figure 3:
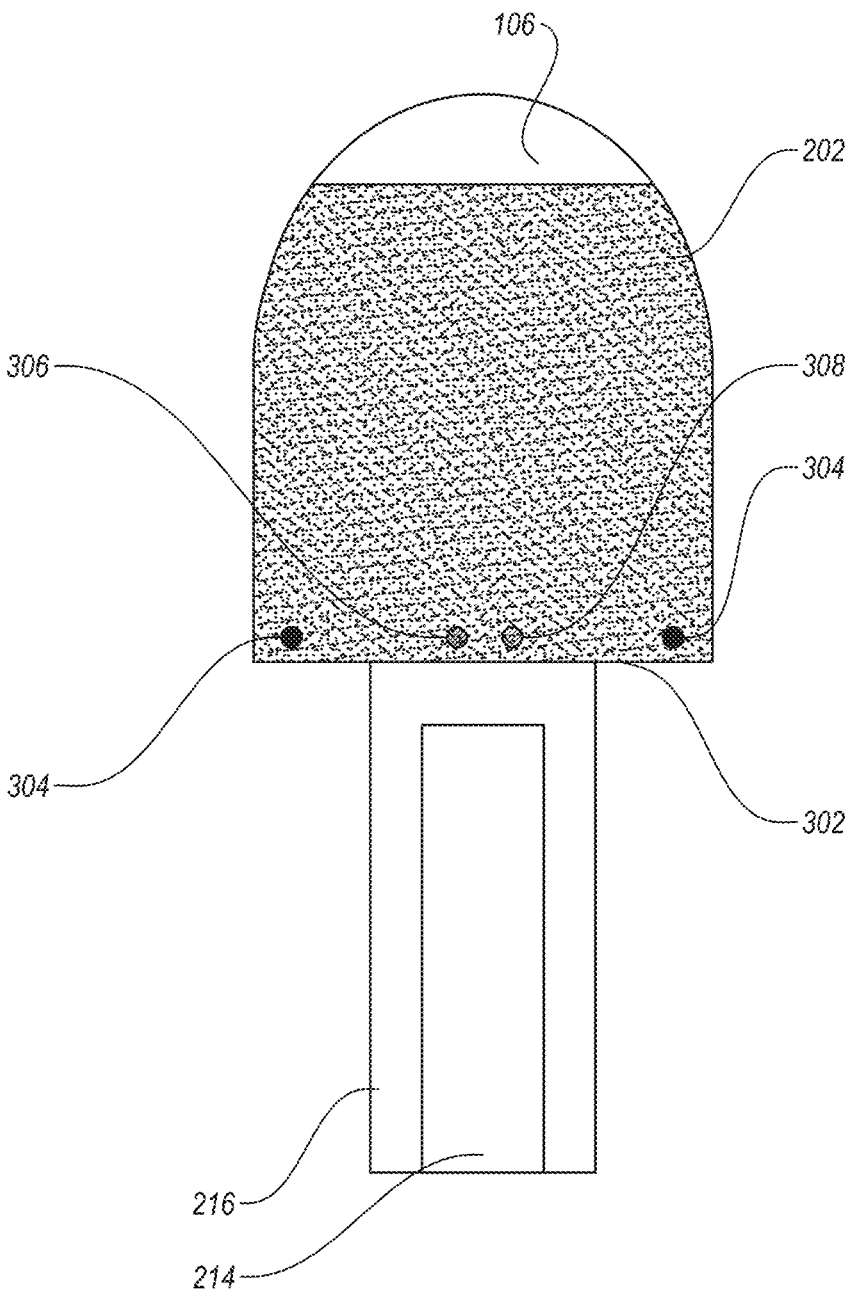
FIG. 3 illustrates a schematic view of a storage tunnel and a container of the storage facility illustrated in FIG. 1, in accordance with embodiments of the disclosure.

FIG. 3 illustrates a schematic view of a storage tunnel 106. As discussed above, the container 214 including radioactive material may be positioned in a storage area 216 extending from the storage tunnel 106. The storage tunnel 106 may also be filled with the backfill 202. Before filling the storage tunnel 106 with the backfill 202, one or more sensors 304, 306, 308 may be positioned near the container 214. The sensors 304, 306, 308 may be configured to continuously monitor the radioactive material.

In the embodiment illustrated in FIG. 3, the sensors 304, 306, 308 are positioned near a floor 302 of the storage tunnel 106. In other embodiments, the sensors 304, 306, 308 may be positioned in other locations within the storage tunnel 106, such as on a wall, on the ceiling, in a central portion of the storage tunnel 106, etc. The storage area 216 extends from the floor 302 of the storage tunnel 106. Therefore, the sensors 304, 306, 308 are positioned in the storage tunnel 106 adjacent to the storage area 216. The sensors 304, 306, 308 include one or more tamper sensors 304, one or more radiation sensors 306, and one or more vibration sensors 308.

The tamper sensors 304 may be sensors configured to detect changes in local dielectric conditions, electrostatic fields, or electromagnetic fields. The changes in local dielectric conditions or electromagnetic fields may be evidence of soil movement or a full intrusion by a person or equipment. The tamper sensors 304 may include ported (e.g., leaky) coaxial cables (PCCs). The tamper sensors 304 may be coupled to a monitor (e.g., monitoring module 112) located in an accessible area, such as in the access tunnels 108 or in the surface facility 102. The tamper sensors 304 may be buried in the backfill 202 near the floor 302 of the storage tunnel 106. Thus, the tamper sensors 304 may be configured to detect if the backfill 202 is removed from the storage tunnel 106 and send an alert that there is an intrusion into the associated storage tunnel 106. As illustrated in the embodiment of FIG. 3, the storage tunnel 106 may include multiple tamper sensors 304 positioned in different locations within the storage tunnel 106. Using multiple tamper sensors 304 may reduce the likelihood of an intruder bypassing the tamper sensors 304 undetected.

The vibration sensor 308 may be configured to detect vibrations in the ground around the storage tunnel 106, such as seismic activity and vibrations caused by equipment operating nearby. The vibration sensor 308 may be an optical fiber system. Optical fiber vibration sensors may facilitate positioning the vibration sensor 308 in the storage tunnel 106 while all electronic components are located remotely, such as in the access tunnels 108 or the surface facility 102. As illustrated in FIG. 3, the vibration sensor 308 is buried under the backfill 202 in the storage tunnel 106 near the floor 302 of the storage tunnel 106. The vibration sensor 308 may be positioned near the storage area 216. The vibration sensor 308 is configured to detect vibrations in the environment around the storage tunnel 106 and the storage area 216. Positioning the vibration sensor 308 in the storage tunnel 106 near the storage area 216 may facilitate the vibration sensor 308 detecting vibrations in a region of the storage tunnel 106 that is most likely to harm the container 214 within the storage area 216.

The radiation sensor 306 may be a sensor configured to detect radiation (e.g., ionizing radiation, gamma radiation) above a threshold value. In some embodiments, the radiation sensor 306 is a binary sensor configured to change a state of the radiation sensor 306 when radiation above the threshold value is detected. In other embodiments, the radiation sensor 306 is an analog sensor configured to detect a range of radiation levels and transmit a signal representative of the level of the radiation, which may then be interpreted by a monitor module (e.g., monitoring module 112) to determine if the radiation detected is above the threshold value.

In some embodiments, the radiation sensor 306 is an optical fiber or bundle of optical fibers configured to generate a signal, such as light, when radiation is detected. For example, the radiation sensor 306 may include scintillating fibers (e.g., plastic scintillating fibers) that are formulated to be sensitive to radiation. A scintillating fiber is a type of optical fiber. The fibers have a multiple (single-layer or double-layer) structure including a scintillating core, such as a polymer (e.g., polystyrene, polyvinyl toluene, polyethylene naphthalate) core. The scintillating core may be configured to emit photons when stimulated by radiation. The scintillating core may include a fluorescent agent (e.g., polyphenyl hydrocarbons, oxazole and oxadiazole aryls) or a wavelength shifting agent. For example, the scintillating core may be doped with the fluorescent agent. The fluorescent agent may be configured to amplify the photons emitted by the scintillating core and to convert any photons in non-visible spectrums (e.g., ultraviolet or infrared) to photons in the visible spectrum. The scintillating fiber may also be substantially surrounded by a cladding material, such as an acrylic cladding material (e.g., methacrylate cladding or polymethylmethyacrylate cladding), configured to maintain the photons within the scintillating fiber. Optical fiber radiation sensors may facilitate positioning a radiation sensor 306 in the storage tunnel 106 while all electronic components are located remotely, such as in the access tunnels 108 or the surface facility 102.

In the embodiment illustrated in FIG. 3, the radiation sensor 306 is buried under the backfill 202 in the storage tunnel 106 near the floor 302 of the storage tunnel 106. The radiation sensor 306 is positioned over the storage area 216, such that the radiation sensor 306 is located over a region of the floor 302 proximate the storage area 216. The radiation sensor 306 is configured to detect radiation escaping from the container 214 in the storage area 216. Positioning the radiation sensor 306 in the storage tunnel 106 near the storage area 216 may facilitate the radiation sensor 306 detecting radiation released from the container 214 in a direction toward the storage tunnel 106, such that the radiation sensor 306 may detect the radiation before the radiation travels through the storage tunnel 106 to an adjacent access tunnel 108.

Figure 4:
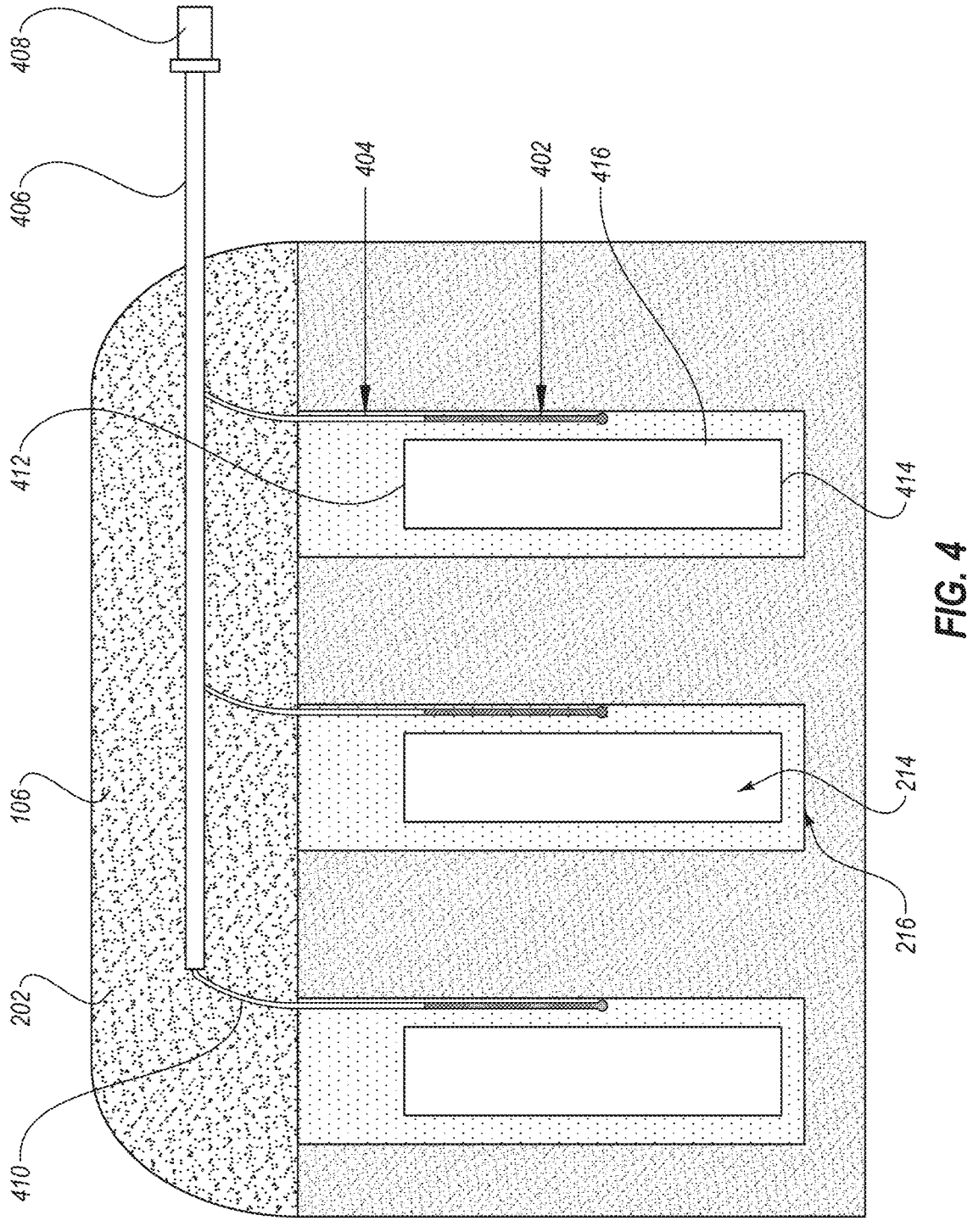
FIG. 4 illustrates a schematic view of a storage tunnel and a container of the storage facility illustrated in FIG. 1, in accordance with embodiments of the disclosure.

FIG. 4 illustrates another embodiment of an arrangement of radiation sensors 410 in a storage tunnel 106. In the embodiment illustrated in FIG. 4, the storage tunnel 106 includes multiple storage areas 216 extending from the storage tunnel 106, each storage area 216 including a separate container 214. Each storage area 216 also includes a separate radiation sensor 410 extending into the storage area 216 alongside the container 214 in the respective storage area 216.

Similar to the radiation sensors 306 (FIG. 3) described above, the radiation sensor 410 may include a scintillating fiber 402. As discussed above, the scintillating fiber 402 may be configured to emit photons and generate light when stimulated by radiation (e.g., gamma radiation). The scintillating fiber 402 is coupled to an optical fiber 404. The optical fiber 404 may be configured to transmit the light generated in the scintillating fiber 402 to a monitoring module (e.g., monitoring module 112) located a distance from the scintillating fiber 402.

The scintillating fiber 402 may have a length greater than about 3 meters (m), such as a length in a range from about 3 m to about 15 m, such as from about 3 m to about 10 m. The scintillating fiber 402 may be coupled to the optical fiber 404 through a connector, such as a SubMiniature version A (SMA) connector, configured to physically and optically couple the scintillating fiber 402 to the optical fiber 404. The optical fiber 404 may have a length in the kilometer scale. For example, the optical fiber 404 may have a length in a range from about 100 m to about 3,000 m, such as from about 100 m to about 1,000 m. The optical fiber 404 may facilitate positioning a monitoring module (e.g., monitoring module 112) in an accessible location, such as in an associated access tunnel 108 or in the surface facility 102 (FIG. 1). The lengths of the scintillating fiber 402 and the optical fiber 404 may enable electronic components to be located distal to the storage tunnel 106.

The scintillating fiber 402 may be positioned along a side surface of the container 214 as illustrated in FIG. 4. The connection between the scintillating fiber 402 and the optical fiber 404 may be located in a region near an axial end 412 of the container 214, such that the scintillating fiber 402 extends along the side surface 416 of the container 214 in a region between the axial ends 412, 414 of the container 214. Positioning the scintillating fiber 402 in the region between the axial ends 412, 414 of the container 214 may facilitate the scintillating fiber 402 detecting radiation exiting the container 214 before the radiation exits the storage area 216. Thus, the scintillating fiber 402 may facilitate detecting radiation from the stored radioactive materials before the radiation exits the storage area 216 into the surrounding environment.

The optical fiber 404 may be substantially disposed in a protective tube 406. The protective tube 406 is configured to substantially prevent damage to the optical fiber 404, such as from impacts or crushing loads from the backfill 202 within the storage tunnel 106. The protective tube 406 may also be configured to substantially prevent the transmission of photons into or out of the optical fiber 404. For example, the protective tube 406 may be furcation tubing, which is a rigid tubing or conduit including a light-tight coating or jacket configured to protect the optical fiber 404 from external light sources and to maintain the light passing through the optical fiber 404 within the optical fiber 404.

In some embodiments, the protective tube 406 is at least partially disposed in a conduit 408. The conduit 408 may be configured to provide additional protection to the optical fiber 404. The conduit 408 may be positioned in higher traffic areas, such as the access tunnels 108 (FIG. 1). For example, the conduit 408 may be part of the stationary equipment 206 (FIG. 2) within the access tunnels 108 (FIG. 2). The conduit 408 may be configured to route the optical fibers 404 from the associated storage tunnel 106 to a monitoring module configured to interpret the light signals from the scintillating fiber 402.

Figure 5:
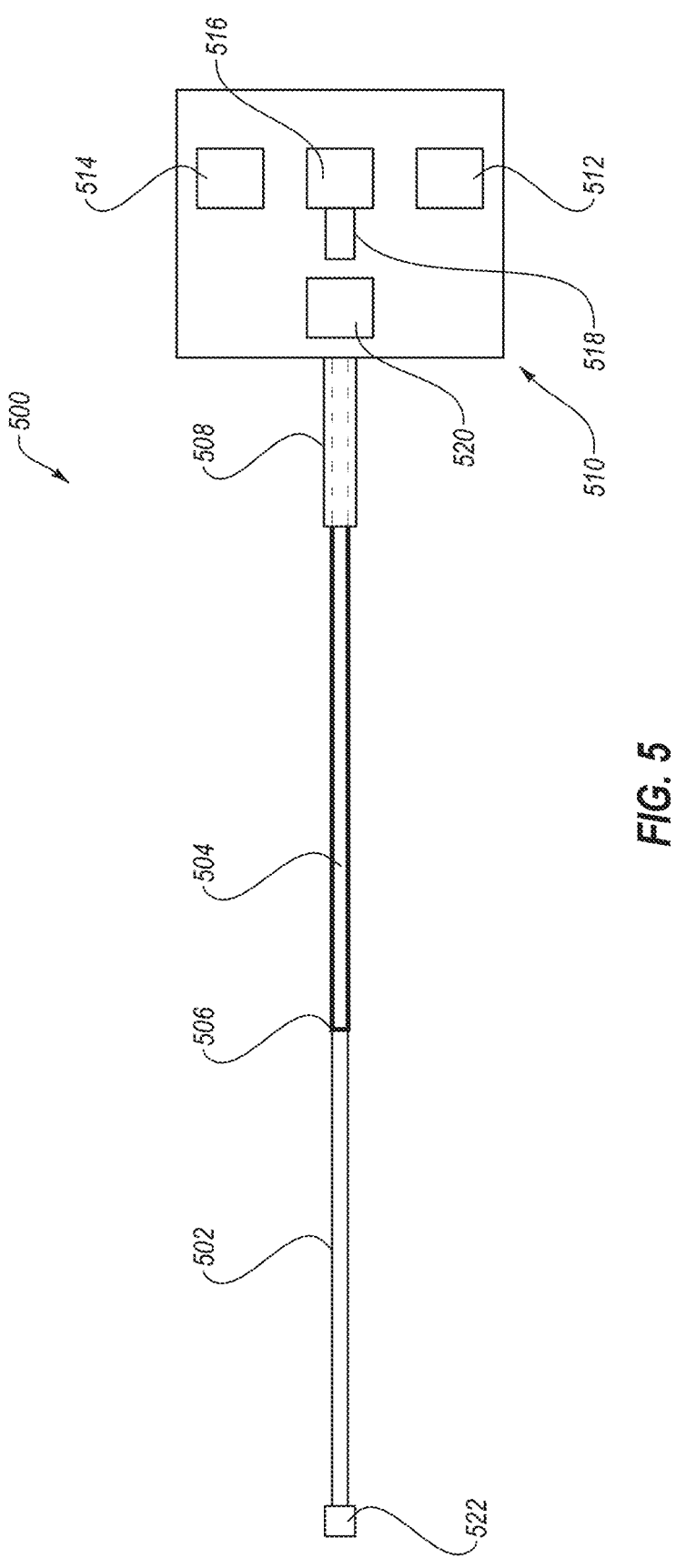
FIG. 5 illustrates a schematic view of a radiation sensor assembly in accordance with embodiments of the disclosure.

FIG. 5 illustrates a schematic view of a radiation sensor assembly 500. As discussed above, the radiation sensor assembly 500 includes a scintillating fiber 502. The scintillating fiber 502 is configured to generate light when stimulated by radiation, such as gamma radiation. As discussed above, the scintillating fiber 502 includes a scintillating core, such as a polymer (e.g., polystyrene, polyvinyl toluene, polyethylene naphthalate) core. The scintillating core is configured to emit photons when stimulated by radiation. The scintillating core also includes a fluorescent agent (e.g., polyphenyl hydrocarbons, oxazole and oxadiazole aryls). The fluorescent agent may be doped into the scintillating core. The fluorescent agent may be configured to multiply the photons emitted by the scintillating core and/or to convert any photons in non-visible spectrums (e.g., ultraviolet or infrared) to photons in the visible spectrum. The scintillating fiber may also be substantially surrounded by a cladding material, such as an acrylic cladding material (e.g., methacrylate cladding or polymethylmethyacrylate cladding), configured to maintain the photons within the scintillating fiber.

The scintillating fiber 502 is coupled to an optical fiber 504 through a coupler 506. The scintillating fiber 502 and the optical fiber 504 combine to form a radiation sensor (e.g., radiation sensor 306, radiation sensor 410). The optical fiber 504 is configured to extend a length of the radiation sensor assembly 500. For example, the optical fiber 504 may be configured to efficiently transfer light between the scintillating fiber 502 and a monitoring module 510. As discussed above, the optical fiber 504 may be at least partially disposed in a protective tube 508, such as the protective tube 406 (FIG. 4). The protective tube 508 may be configured to protect the optical fiber 504 from physical damage and/or to protect the optical fiber 504 from light pollution, such as from external lights that may interrupt, interfere, or cause noise in the light signal passing through the optical fiber 504. The coupler 506 is a coupler configured to both physically and optically couple the scintillating fiber 502 to the optical fiber 504. For example, the coupler 506 may be an SMA connector or a fused connection (e.g., polarization maintaining fused coupler (PMC)). The coupler 506 may be supported by external mechanical couplers, such as wraps, shrink wraps, clamps, etc.

The optical fiber 504 is coupled to a monitoring module 510 on a first longitudinal end of the optical fiber 504 opposite the second longitudinal end of the optical fiber 504 that is coupled to the scintillating fiber 502 through the coupler 506. The monitoring module 510 includes a power supply 512, a processor 514, and a sensor module 516. The power supply 512 is configured to supply power to the components of the monitoring module 510, such as the processor 514 and the sensor module 516 and any other electronic components housed in the monitoring module 510. The power supply 512 may be an internal power source, such as a battery or a device configured to receive power from an external power supply, such as line power, a generator, a transformer, etc.

The processor 514 is configured to process data received by the sensor module 516 or other components of the monitoring module 510. For example, the processor 514 may interpret raw data received by the sensor module 516 or other components of the monitoring module 510. In another example, the processor 514 may make decisions based on the data received, such as whether to transmit an alert based on the data received. In some embodiments, the processor 514 is coupled to a memory device configured to store data received from the sensor module 516 and other components in the monitoring module 510. In some embodiments, the monitoring module 510 includes one or more of a receiver and a transmitter configured to transmit data processed by the processor 514 and/or to receive data or commands from another module or controller.

The sensor module 516 is configured to receive and/or process data generated by the scintillating fiber 502. For example, the sensor module 516 may be configured to receive photons generated by the scintillating fiber 502 and generate data readable by the processor 514 from the photons. The sensor module 516 may include data enhancing components. For example, in the embodiment illustrated in FIG. 5, the sensor module 516 includes a multiplier tube 518. The multiplier tube 518 may be a photomultiplier tube configured to multiply a current produced by incident light by up to 100 million times in multiple dynode stages. The multiplier tube 518 may facilitate the detection of photons (e.g., individual photons) when the incident flux of light is low.

The monitoring module 510 may also include a damage detection device 520 configured to detect damage to the optical fiber 504 or the scintillating fiber 502. The damage detection device 520 may detect unintentional damage, such as damage caused by movement in the surrounding environment, such as seismic activity or damage caused by vehicle traffic as well as intentional damage (e.g., tampering damage), such as intentionally cut cables or removed sensors. The damage detection device 520 may include a signal generation device configured to transmit a signal (e.g., a light signal) from the monitoring module 510 into the optical fiber 504. The signal generation device may include a light-emitting diode (LED) or other pulsed light source configured to create a pulsed light signal. A reflective element 522 may be positioned on an opposite end of the scintillating fiber 502. The signal from the signal generation device in the damage detection device 520 may reflect off the reflective element 522 after passing through the optical fiber 504 and the scintillating fiber 502. The signal may then pass through the scintillating fiber 502 and the optical fiber 504 in a reverse direction until being received by a receiver in the damage detection device 520. If the signal is not received by the damage detection device 520 after a predetermined time period, the damage detection device 520 may be configured to transmit an alert to the processor 514 that damage is detected. The predetermined time may be selected based on a length of the optical fiber 504 and the scintillating fiber 502.

In other embodiments, a second optical fiber is coupled to the scintillating fiber 502 on the opposite end of the scintillating fiber 502 in place of the reflective element 522. The second optical fiber may be configured to inject a light pulse at the end of the scintillating fiber 502 that may then be detected by a light sensor in the damage detection device 520. If the light pulse signal from the second optical fiber does not reach the damage detection device 520, the damage detection device 520 may provide an alert or signal that damage has been detected.

A single monitoring module 510 may include multiple radiation sensor assemblies 500 extending from the monitoring module 510. For example, multiple bundles of optical fibers 504 may be coupled to one monitoring module 510. In some embodiments, each individual optical fiber 504 is coupled to a respective sensor module 516 and damage detection device 520. In other embodiments, multiple optical fibers 504 may be coupled to a single sensor module 516 or damage detection device 520, such that the sensor module 516 and/or the damage detection device 520 are monitoring multiple optical fibers 504. The processor 514 may be configured to process and store the data received from the multiple optical fibers 504, such that if the scintillating fiber 502 of one of the multiple optical fibers 504 generates a light signal indicating that radiation has been detected, the processor 514 provides an alert that radiation is detected in the location corresponding to the scintillating fiber 502 that generated the light signal.

Figure 6:
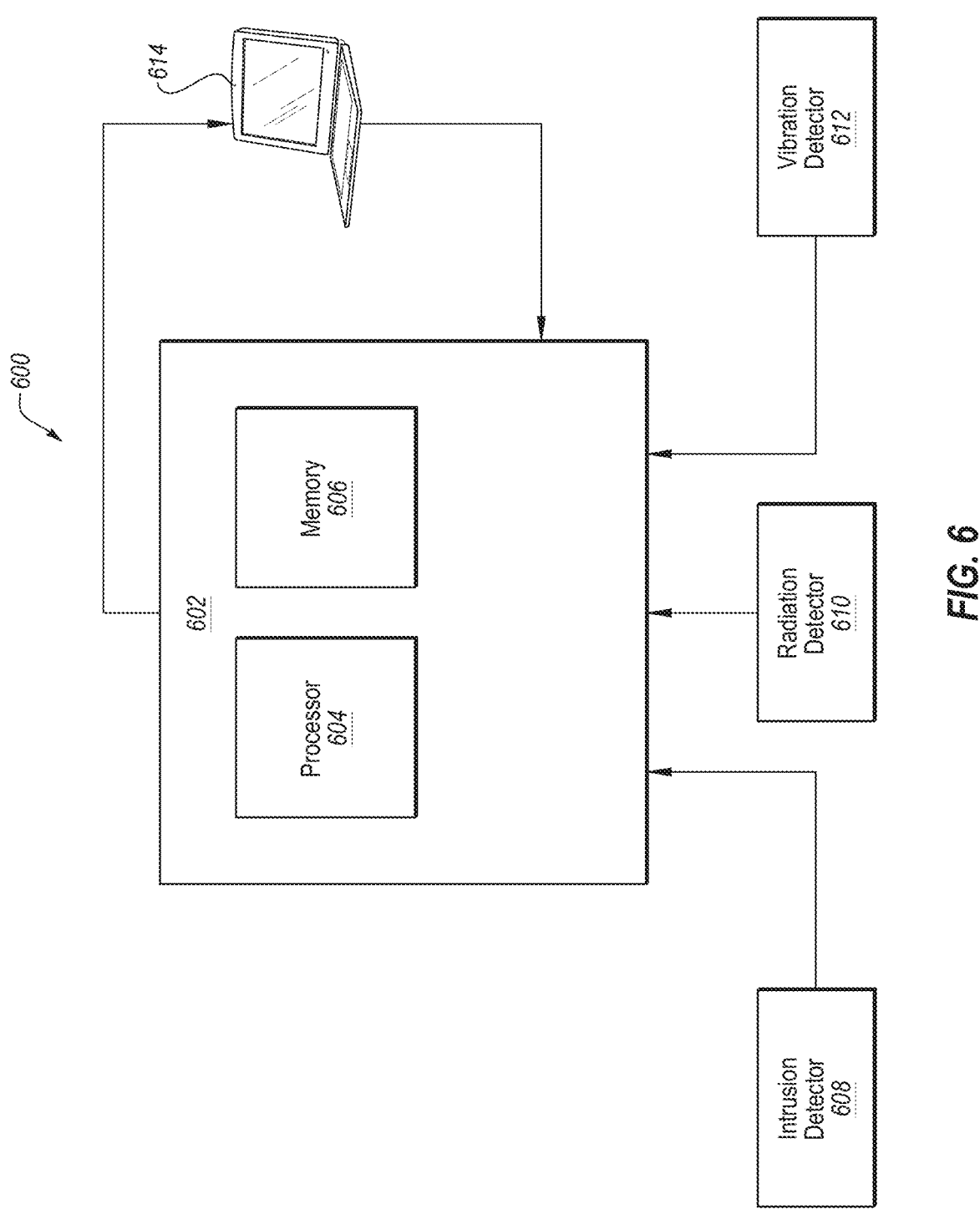
FIG. 6 illustrates a schematic view of a monitoring system in accordance with embodiments of the disclosure.

As discussed above, with respect to FIG. 3, the radiation sensor assembly 500 may be part of a larger monitoring system. FIG. 6 illustrates a schematic view of a monitoring system 600. The monitoring system 600 includes a monitoring module 602 including a processor 604 and a memory 606. The monitoring module 602 is operatively coupled to one or more detectors 608, 610, 612. In the embodiment illustrated in FIG. 6, the monitoring module 602 is coupled to an intrusion detector 608, a radiation detector 610, and a vibration detector 612.

The intrusion detector 608 may include a tamper sensor (e.g., tamper sensor 304). In some embodiments, the intrusion detector 608 includes a monitoring module associated with the intrusion detector 608, such that the monitoring module of the intrusion detector 608 is operatively coupled to the monitoring module 602, such as through hard-wired contacts or a network connection. In other embodiments, the tamper sensors of the intrusion detector 608 are directly coupled to the monitoring module 602, such that the monitoring module 602 is configured to function as the monitoring module for the individual tamper sensors of the intrusion detector 608.

The radiation detector 610 may be similar to the radiation sensor assembly 500 and/or radiation sensors 306, 410. In some embodiments, the radiation detector 610 includes a monitoring module (e.g., monitoring module 510) associated with the radiation detector 610 that may be operatively coupled to the monitoring module 602, such as through hard-wired contacts or a network connection. In other embodiments, the monitoring module 602 may be configured to function as the monitoring module (e.g., monitoring module 510) of the radiation detector 610. For example, the monitoring module 602 may be directly coupled to the optical fiber (e.g., optical fiber 404, 504) of the radiation sensors (e.g., radiation sensor 306, 410), and the monitoring module 602 may include sensor modules (e.g., sensor module 516) and damage detection devices (e.g., damage detection device 520) configured to interface with the optical fibers of the radiation sensors.

The vibration detector 612 may include a vibration sensor (e.g., vibration sensor 308). In some embodiments, the vibration detector 612 includes a monitoring module associated with the vibration detector 612, such that the monitoring module of the vibration detector 612 is operatively coupled to the monitoring module 602, such as through hard-wired contacts or a network connection. In other embodiments, the vibration sensors of the vibration detector 612 are directly coupled to the monitoring module 602, such that the monitoring module 602 is configured to function as the monitoring module for the individual vibration sensors of the vibration detector 612.

The processor 604 may be configured to receive and process data from the individual detectors 608, 610, 612. For example, the processor 604 may receive data from one or more of the intrusion detector 608, radiation detector 610, and vibration detector 612. The data may be stored in the memory 606 of the monitoring module 602. The memory 606 may also include instructions configured to cause the processor 604 to take specific actions with the different types of data. For example, the instructions may cause the processor 604 to sort the data based on different criteria, such as the type of data, the location of the associated sensor, the type of sensor, etc. The instructions may also cause the processor 604 to prioritize the data. For example, alerts and alarms may be prioritized over conventional reporting data.

The data processed by the processor 604 and/or stored in the memory 606 may be transmitted to a monitoring station 614. The monitoring station 614 may be configured to provide a user interface for personnel to receive data and alerts from the monitoring module 602 and to provide control inputs, such as resetting alarms or manually checking status of different sensors. For example, if one or more of the detectors 608, 610, 612 detect an alarm or alert condition, such as radiation detected by the radiation detector 610, an intrusion detected by the intrusion detector 608, or a vibration detected by the vibration detector 612, the processor 604 may send an alert to the monitoring station 614. The alert may manifest as a light, a notification, an alarm, a sound, etc. In some cases, different types of alerts may manifest in a different manner. For example, different threshold levels may provide different types of alerts. If the alert is generated due to a signal from the radiation detector 610, different alerts may sound based on the amount of radiation detected (e.g., a low radiation level alert and a high radiation level alarm) or whether the alert is due to the detection of radiation or the detection of damage to the optical fibers of the radiation sensor.

In some embodiments, the monitoring station 614 is configured to facilitate a user sending commands or requests to the monitoring module 602. For example, the user may send a reset command to the monitoring module 602 to verify whether an alert or alarm condition has been resolved. In some cases, the user may send a request to the monitoring module 602 from the monitoring station 614 to retrieve additional data. For example, an alert transmitted from the monitoring module 602 may indicate that an alarm condition exists, such as the detection of radiation. After receiving the alert, the user may request additional information from the monitoring module 602, such as the location of the detected radiation, the level of radiation detected, history data from the associated radiation detector 610, etc., to facilitate determining how to respond to the alert (e.g., the level of the response, the type of response, where to respond, equipment needed for the response, etc.).

Embodiments of the disclosure are configured to continuously monitor radioactive material storage facilities. The sensor assemblies of the disclosure facilitate positioning maintenance components in locations that are separated from the storage areas by both distance and significant shielding. The separation improves safety for the personnel monitoring and maintaining the storage facilities. The separation may also facilitate faster maintenance response, at least in part due to a reduction in access restrictions and personal protection equipment (PPE) needed for access to components needing frequent maintenance. The separation may also facilitate a reduction in the training needed for conventional maintenance personnel, at least due to a reduced risk of exposure to dangerous conditions.

The faster responses and improved monitoring capabilities provided by the embodiments of the disclosure may further reduce the risks of major environmental contamination. For example, improved sensor sensitivities and locations may result in the detection of radiation leaks before radiation permeates into the ground or environment around the facility, such that any leak or other problem may be resolved before significant contamination has occurred.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A radiation monitoring system comprising:
an optical fiber;
a scintillating fiber operatively coupled to a first end of the optical fiber at a first end of the scintillating fiber; and
a damage detection device configured to detect damage to at least one of the optical fiber and the scintillating fiber, the damage detection device comprising:
a signal generation device configured to generate a signal in the optical fiber and/or the scintillating fiber; and
a receiver configured to receive a reflection of the signal.

2. The radiation monitoring system of claim 1, wherein the damage detection device comprises a reflective element positioned on a second end of the scintillating fiber opposite the first end of the scintillating fiber.

3. The radiation monitoring system of claim 1, wherein the signal generation device is positioned on a second end of the optical fiber opposite the first end of the optical fiber.

4. The radiation monitoring system of claim 3, wherein the signal generation device comprises a pulsed light source.

5. The radiation monitoring system of claim 1, further comprising a monitoring module coupled to a second end of the optical fiber opposite the first end of the optical fiber.

6. The radiation monitoring system of claim 5, wherein the optical fiber is configured to transfer light from the scintillating fiber to the monitoring module.

7. The radiation monitoring system of claim 1, wherein at least a portion of the optical fiber is disposed in a protective tube configured to substantially prevent a transmission of photons into or out of the optical fiber.

8. The radiation monitoring system of claim 1, wherein the scintillating fiber has a length of up to about 10 meters.

9. The radiation monitoring system of claim 1, wherein the optical fiber has a length in a kilometer scale.

10. The radiation monitoring system of claim 1, wherein the scintillating fiber is operatively coupled to the optical fiber through a coupler configured to physically couple and optically couple the scintillating fiber to the optical fiber.

11. A radioactive material storage system comprising:
a storage tunnel;
a storage area proximal to the storage tunnel;
a canister configured to contain radioactive material disposed in the storage area; and
a radiation sensor at least partially disposed in the storage area, the radiation sensor comprising:
a first segment comprising a scintillating fiber, the first segment positioned along a side surface of the canister;
a second segment comprising an optical fiber coupled between the scintillating fiber and a monitoring module; and
the monitoring module positioned in an accessible region a distance from the storage tunnel.

12. The radioactive material storage system of claim 11, further comprising a vibration sensor positioned in the storage tunnel.

13. The radioactive material storage system of claim 11, further comprising a tamper sensor positioned in the storage tunnel.

14. The radioactive material storage system of claim 11, further comprising a monitoring station configured to receive data from the monitoring module of the radiation sensor.

15. The radioactive material storage system of claim 11, wherein the first segment of the radiation sensor has a length of up to about 15 meters.

16. The radioactive material storage system of claim 11, wherein the second segment has a length of up to about 3,000 meters.

17. The radioactive material storage system of claim 11, wherein the monitoring module is positioned in a surface facility of the radioactive material storage system.

18. The radioactive material storage system of claim 11, wherein the monitoring module is positioned in an access tunnel of the radioactive material storage system.

19. A method of monitoring a radiation detector, the method comprising:
transmitting a light signal into a first end of an optical fiber;
receiving the light signal in a first end of a scintillating optical fiber positioned at a second end of the optical fiber opposite the first end of the optical fiber;

reflecting the light signal from a reflective element positioned on a second end of the scintillating optical fiber opposite the first end of the scintillating optical fiber;

receiving the light signal at the first end of the optical fiber; and determining if the radiation detector is damaged if the light signal is not received at the first end of the optical fiber.

20. The method of claim 19, wherein transmitting the light signal comprises pulsing a light into the first end of the optical fiber.

* * * * *